UNITED STATES PATENT OFFICE.

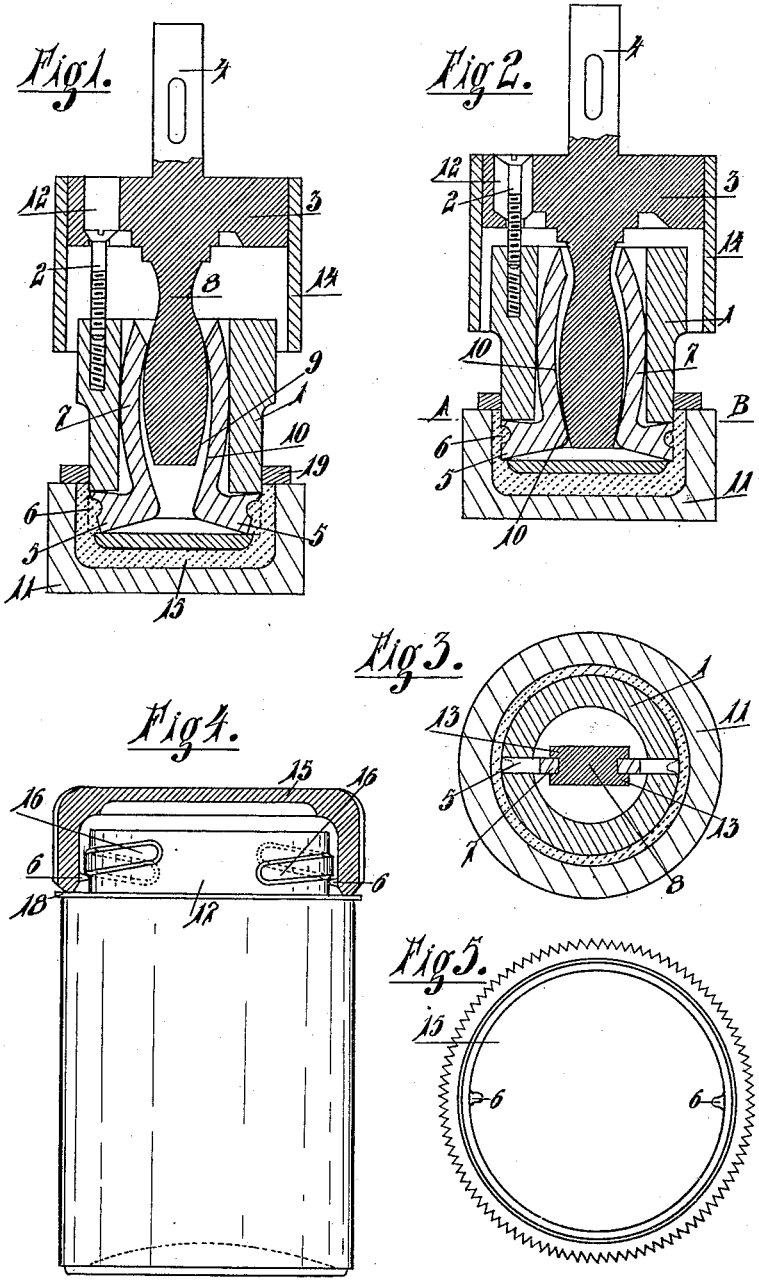

ARTHUR BRANCART, OF FAUQUEZ-BY-VIRGINAL, BELGIUM.

GLASS-MOLDING PLUNGER.

1,274,673.  Specification of Letters Patent.  Patented Aug. 6, 1918.

Application filed April 7, 1917. Serial No. 160,560.

*To all whom it may concern:*

Be it known that I, ARTHUR BRANCART, director of the company "Verreries de Fauquez," residing at Fauquez-by-Virginal, Belgium, and a citizen of the Kingdom of Belgium, have invented certain new and useful Improvements in Glass - Molding Plungers; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The present invention relates to a device for molding hollow wares in glass or any other plastic material, provided with prominences or projecting parts on the inner face of their side wall.

Glass hollow wares are usually molded by means of a punch having a shape corresponding to the shape to be given to the inner face of the hollow ware, said punch being brought down in a mold with a shape corresponding to the outer shape of the hollow ware and previously provided with the quantity of pasty glass necessary for the fabrication of the ware.

When it is desired to create on the inner face of the side wall projecting parts which do not extend on the whole length of the wall, this simple device cannot be used without special arrangements, since it would be impossible, for instance, to remove the punch from the mold without tearing out the projecting parts.

The present invention has for its object a device rendering it possible to create projecting parts perfectly molded and to take away the punch after molding.

The main feature of this device consists in a punch comprising free portions which are capable of moving from the interior toward the exterior and vice-versa and which are provided with hollow impressions corresponding to the projecting parts to be created on the wall. The punch is brought down into the molds with its movable portions slightly drawn inside, these movable portions are then forced outward so as to mold the prominence on the inside of the wall, they are afterward removed inside again so as to clear the projecting parts created on the wall, after which the punch can be taken away from the mold.

The following specification describes by way of example a device allowing to perform mechanically these operations by means of a rod supporting the punch and adapted to move with respect to the punch after the latter has completely entered the mold. During said movement the rod acts, by means of surfaces profiled in the shape of cams, upon swinging arms connected to the movable portions, so as to cause said movable portions to move outward when the rod is pushed downward and to move inward when the rod is drawn upward. After the movable portions of the punch have been brought inside, the rod continues its upward motion and carries away the punch out of the mold.

In the accompanying drawings the invention is shown in its application to the fabrication of a glass lid for preserve or jellypot, showing on the inner face of the side wall two buttons used for fixing the cover to the neck.

Figure 1 is a longitudinal section showing the apparatus at the moment the punch has been brought down in the mold and the prominences in the wall are not yet molded.

Fig. 2 is a similar section showing the position of the parts of the apparatus after molding of said prominences.

Fig. 3 is a section taken on a line A—B of Fig. 2.

Fig. 4 shows a section of the cover arranged on the neck of a pot.

Fig. 5 is a view of the inside of the cover.

The device comprises a punch 1 having a shape corresponding to that of the interior of the hollow ware. This punch is hung by means of screws such as 2 to a plate 3 fixed to a rod 4 which can be moved upward and downward by any suitable way. The punch 1 is hollow and provided at its lower end with two radial openings in which are arranged the movable portions 5 of the punch, which possess hollow impressions corresponding to the shape of the two buttons 6 to be molded on the wall. Each movable portion 5 is provided with an arm 7 of an incurved shape, which can swing on the point of contact of its convex portion against the wall of the punch, so that the movable portion 5 is then forced outward or inward. These movements of the movable parts 5 are obtained mechanically by means of a rod 8 extending in a line with the rod 4. This rod 8 is provided with two convex surfaces 9 adapted to act on the concave faces 10 of the arms 7 so as to force them to swing when the rod 8 receives a downward or upward motion.

The device works as follows: When the punch 1 hangs to the plate 3 as shown in Fig. 1, the rod 8 is in its upward position with respect to the punch and it pushes the upper end of the two arms 7 so as to hold the latter in such a position that the movable portions 5 of the punch are drawn inside. The punch 1 is so brought down in the usual mold 11 having a shape corresponding to the external shape of the cover and in which the necessary quantity of glass has previously been poured. The downward motion of the punch is stopped by the ring 19 coming in contact with the edge of the mold, when the ware has obtained the general shape desired, and the various parts of the device are then in the relative position shown in Fig. 1. The rod 4 continues then its downward motion, which is possible because the head of the screws 2 can slide freely in holes 12 of the plate 3. The convex surfaces 9 of the rod 8 engage with the concave surfaces 10 of the arms 7 and cause the outer convex surfaces of said arms to move or roll over the inner surface of the punch and thereby force outwardly the portions 5 of the punch to mold the buttons 6 in the glass, as shown in Fig. 2. Thereupon the rod 8 is drawn upward and as it comes again in the position shown in Fig. 1, the movable portions 5 are again drawn inward. At this very moment the heads of the screws 2 are in contact with the conical surface at the bottom of the holes 12, in such a manner that when the rod 4 continues its upward motion, it takes the punch 1 out of the mold.

The position of the screws 2 can be regulated by screwing them more or less in their housing in the punch 1.

As it will be seen in Fig. 3, the rod 8 is provided with flanges 13 adapted to serve as guides during the movements of the rod with respect to the arms 7. On the plate 3 is arranged a protecting cylinder 14.

The hollow ware molded in the example hereabove described is a pot-lid 15 provided with two buttons 6 intended to be brought into contact with the lower face of two screw-shaped ribs 16 created on the neck 17 of the vessel to be covered. This vessel may be of any material and adapted to any use (bottle, jelly-pot, preserving or sterilizing vessel, etc.) Such a cover is fixed on the neck by causing the cover to turn as if it would be screwed on the neck so that the edge of the cover is pressed against the india-rubber ring 18.

What I claim is:

1. In a device for molding hollow glass articles having inner projections, a mold, a punch, curved portions contained in said punch and adapted to roll over the inner surface thereof, said curved portions being formed at their lower extremities with hollow recesses corresponding in shape to the projections to be molded, and a rod coöperating with said portions to cause the same to roll over the inner surface of the punch.

2. In a device for molding hollow glass articles having inner projections, a mold, a punch, curved portions contained in said punch and adapted to roll over the inner surface thereof, said curved portions being formed at their lower extremities with hollow recesses corresponding in shape to the projections to be molded, and a rod formed with cam-shaped surfaces coöperating with said portions to cause the same to roll over the inner surface of the punch.

In testimony whereof I affix my signature in presence of two witnesses.

ARTHUR BRANCART.

Witnesses:
 GEORGES VANDER HAEGHEN,
 CHARLES MEREHIE.

Copies of this patent may be obtained for five cents each, by addressing the "Commissioner of Patents, Washington, D. C."